United States Patent
Imai

(10) Patent No.: US 9,812,974 B2
(45) Date of Patent: Nov. 7, 2017

(54) RESONANT INVERTER AND ISOLATED RESONANT POWER SUPPLY DEVICE

(71) Applicant: TDK CORPORATION, Tokyo (JP)

(72) Inventor: Katsunori Imai, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/082,753

(22) Filed: Mar. 28, 2016

(65) Prior Publication Data

US 2016/0336865 A1 Nov. 17, 2016

(30) Foreign Application Priority Data

May 12, 2015 (JP) .................................. 2015-096988

(51) Int. Cl.
*H02M 3/335* (2006.01)
*H02M 7/537* (2006.01)
*H02M 7/48* (2007.01)

(52) U.S. Cl.
CPC ... *H02M 3/33546* (2013.01); *H02M 3/33576* (2013.01); *H02M 3/33592* (2013.01); *H02M 7/537* (2013.01); *H02M 2007/4815* (2013.01); *Y02B 70/1433* (2013.01); *Y02B 70/1441* (2013.01)

(58) Field of Classification Search
CPC ............................................... H02M 3/33546
See application file for complete search history.

(56) References Cited

U.S. PATENT DOCUMENTS

| 4,204,268 | A | * | 5/1980 | Vivirito | H02M 7/517 363/135 |
| 6,137,698 | A | * | 10/2000 | Yukawa | H02M 3/33576 363/127 |
| 7,889,519 | B2 | | 2/2011 | Perreault et al. | |
| 7,924,580 | B2 | | 4/2011 | Glaser et al. | |
| 2006/0012312 | A1 | * | 1/2006 | Lyle | H05B 41/3927 315/194 |
| 2015/0246614 | A1 | * | 9/2015 | Dames | B60L 5/005 191/10 |

* cited by examiner

Primary Examiner — Jue Zhang
Assistant Examiner — Trinh Dang
(74) *Attorney, Agent, or Firm* — Oliff PLC

(57) ABSTRACT

A resonant inverter includes an input terminal, a first switch, a second switch, a transformer, a first resonant circuit, and a second resonant circuit. To the input terminal, an input voltage is applied. The first switch and the second switch are alternately turned on and off. The transformer includes a first winding and a second winding on a primary side. The first resonant circuit includes a first capacitive element and a first coil. The second resonant circuit includes a second capacitive element and a second coil. The first switch, the first winding, and the first resonant circuit constitute a first inverter circuit. The second switch, the second winding, and the second resonant circuit constitute a second inverter circuit. The input terminal is connected between the first winding and the second winding.

17 Claims, 8 Drawing Sheets

RESONANT INVERTER AND ISOLATED RESONANT POWER SUPPLY DEVICE

BACKGROUND OF THE INVENTION

1. Field of the Invention

The present invention relates to a resonant inverter and an isolated resonant power supply device in which the operating voltage of a switch included therein can be easily decreased.

2. Description of the Related Art

U.S. Pat. No. 7,889,519 discloses an isolated resonant converter in which an isolation transformer is placed on the resonant rectifier side in order to isolate and supply to a load the output of the resonant inverter (see FIG. 7). U.S. Pat. No. 7,924,580 discloses a non-isolated push-pull resonant inverter that includes two switches having phases which differ by 180 degrees and alternately turned on and off to supply power to a load (see FIG. 8). U.S. Pat. No. 7,889,519 and U.S. Pat. No. 7,924,580 disclose techniques in which the drain-source impedances of the switches are maximized at the drive frequency and at the frequency three times the drive frequency, and are minimized at the frequency about twice the drive frequency, thereby decreasing the switch voltage.

The disclosed push-pull inverter is formed by coupling two single-ended inverters together and is able to simply handle a power twice that of one single-ended inverter. In general, in a high-frequency inverter, driving a high-side switch, such as a bridge circuit, at a high frequency is difficult from the viewpoint of preventing a flow-through current between the high-side switch and a low-side switch because a short dead time needs to be assured. However, the disclosed push-pull inverter drives only the low-side switch, which provides a method that is effective in extending the power range of the inverter driven at a high frequency.

However, in the related art, the isolation transformer is connected to the resonant rectifier side, and therefore, a voltage applied to the primary side of the isolation transformer is divided across the inductance of the resonant rectifier and the self-inductance and leakage inductance of the transformer. If the inductance of the resonant rectifier varies, the input voltage of the transformer varies. As a result, the resonance condition setting and the output voltage range vary, which is an issue. The isolation transformer is added to the resonant rectifier side, and therefore, the transformer needs to be provided separately from two push-pull coils. Resonators are respectively provided for the switches having phases that differ by 180 degrees, and the resonant frequencies are separately adjusted. As a result, adjustments need to be made on a large number of portions, which is also an issue. In a case where the impedance at the point corresponding to the frequency equal to the drive frequency and the impedance at the point corresponding to the frequency three times the drive frequency are maximized, as disclosed in U.S. Pat. No. 7,889,519 and U.S. Pat. No. 7,924,580, the switch voltage is not necessarily minimized, which is also an issue.

SUMMARY OF THE INVENTION

The present invention is made in view of the issues of the related art described above, and there are provided a resonant inverter and an isolated resonant power supply device for which the output voltage can be easily adjusted, the life of switches included therein can be extended by decreasing the operating voltages of the switches, and downsizing and cost reduction of the device can be achieved.

In order to address the above-described issues, a resonant inverter according to an aspect of the present invention includes an input terminal, a first switch, a second switch, a transformer, a first resonant circuit, and a second resonant circuit. To the input terminal, an input voltage is applied. The first switch and the second switch are alternately turned on and off. The transformer includes a first winding and a second winding on a primary side. The first resonant circuit includes a first capacitive element and a first coil. The second resonant circuit includes a second capacitive element and a second coil. The first switch, the first winding, and the first resonant circuit constitute a first inverter circuit. The second switch, the second winding, and the second resonant circuit constitute a second inverter circuit. The input terminal is connected between the first winding and the second winding of the transformer.

The input terminal is connected between the first winding and the second winding of the transformer, and therefore, the voltage applied to the transformer can be determined on the basis of the input voltage and the ratio between the inductance of the first coil or that of the second coil and the leakage inductance and self-inductance of the transformer without being affected by the resonator of the resonant rectifier. Accordingly, the turns ratio of the transformer can be determined independently of the resonant rectifier on the secondary side, and therefore, it is possible to easily adjust the output voltage.

In the resonant inverter described above, the first capacitive element may be connected in parallel to the first switch, the second capacitive element may be connected in parallel to the second switch, the first coil may be placed between the first switch and the first winding, and the second coil may be placed between the second switch and the second winding. Accordingly, the turns ratio of the transformer can be determined independently of the resonant rectifier on the secondary side, and therefore, it is possible to easily adjust the output voltage.

The resonant inverter described above may further include a fifth resonant circuit that includes a third capacitive element and a third coil and that is placed between the first switch and the second switch. Accordingly, the fifth resonant circuit that includes the third capacitive element and the third coil may be shared by the first inverter circuit and the second inverter circuit. Therefore, downsizing and cost reduction of the circuit and device and a simplified adjustment of the resonance frequencies can be achieved.

The resonant inverter described above may further include a third resonant circuit that includes a series connection of a fourth coil and a fourth capacitive element, the series connection being placed parallel to the first switch; and a fourth resonant circuit that includes a series connection of a fifth coil and a fifth capacitive element, the series connection being placed parallel to the second switch. Accordingly, the turns ratio of the transformer can be determined independently of the resonant rectifier on the secondary side, and therefore, it is possible to easily adjust the output voltage.

In order to address the above-described issues, a resonant inverter according to an aspect of the present invention includes an input terminal, a first switch, a second switch, a transformer, a first resonant circuit, and a second resonant circuit. To the input terminal, an input voltage is applied. The first switch and the second switch are alternately turned on and off. The transformer includes a first winding and a second winding on a primary side. The first resonant circuit is formed of a first capacitive element and a leakage inductance of the transformer. The second resonant circuit is formed of a second capacitive element and the leakage inductance of the transformer. The first switch, the first winding, and the first resonant circuit constitute a first inverter circuit. The second switch, the second winding, and the second resonant circuit constitute a second inverter circuit. The input terminal is connected between the first winding and the second winding of the transformer.

Accordingly, the turns ratio of the transformer can be determined independently of the resonant rectifier on the secondary side. Further, the first resonant circuit and the second resonant circuit are configured by using the leakage inductance of the transformer. As a result, it is possible to eliminate the first coil and the second coil, and to achieve downsizing and cost reduction of the circuit and device.

In the resonant inverter described above, at least three resonance points may be generated in response to resonance of the first resonant circuit, the second resonant circuit, and the fifth resonant circuit, the three resonance points including a first resonance point, a second resonance point, and a third resonance point, and if a lowest resonance frequency that corresponds to the first resonance point is denoted by F1, a highest resonance frequency that corresponds to the third resonance point is denoted by F3, the second resonance point that corresponds to a resonance frequency between F1 and F3 is fixed, and a drive frequency for driving the first switch or the second switch is denoted by Fs, then, $1Fs \leq (F3-F1) < 2Fs$ may be satisfied. Accordingly, the operating voltage of the first switch or the second switch can be decreased. As a result, the life of the switch can be extended.

In the resonant inverter described above, at least three resonance points may be generated in response to resonance of the first resonant circuit, the second resonant circuit, and the third or fourth resonant circuit, the three resonance points including a first resonance point, a second resonance point, and a third resonance point, and if a lowest resonance frequency that corresponds to the first resonance point is denoted by F1, a highest resonance frequency that corresponds to the third resonance point is denoted by F3, the second resonance point that corresponds to a resonance frequency between F1 and F3 is fixed, and a drive frequency for driving the first switch or the second switch is denoted by Fs, then, $1Fs \leq (F3-F1) < 2Fs$ may be satisfied. Accordingly, the operating voltage of the first switch or the second switch can be decreased. As a result, the life of the switch can be extended.

According to the aspects of the present invention, it is possible to provide a resonant inverter and an isolated resonant power supply device for which the resonance frequencies can be easily adjusted, the life of the switch can be extended by decreasing the operating voltage of the switch, and downsizing and cost reduction of the device can be achieved.

DESCRIPTION OF THE PREFERRED EMBODIMENTS

Figure 1:
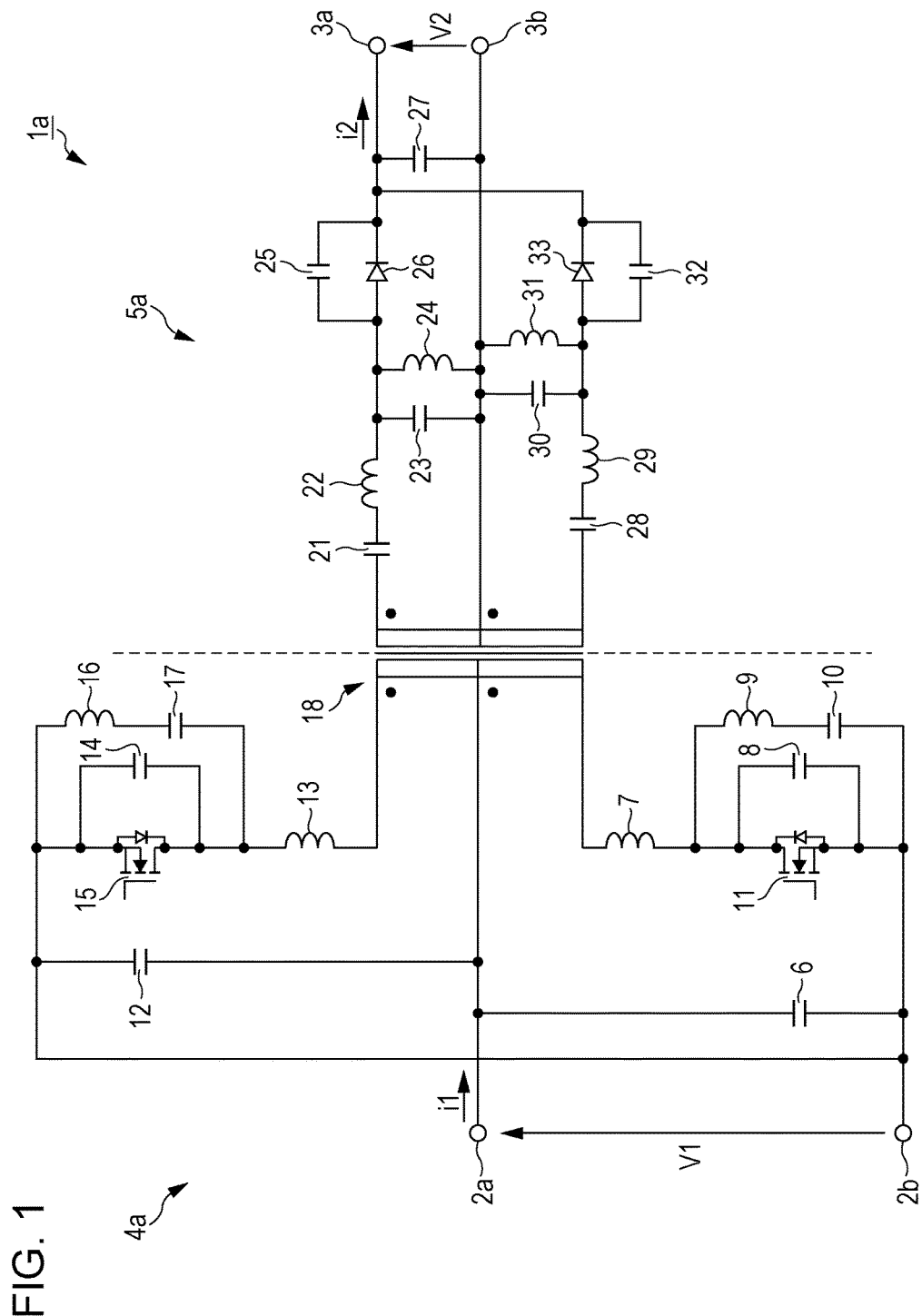
FIG. 1 illustrates an isolated resonant converter circuit according to a first embodiment of the present invention.

Hereinafter, exemplary embodiments of the present invention will be described; however, exemplary embodiments of the present invention are not limited to those described below. Constituent elements described below include those that can be easily conceived by a person skilled in the art and those that are substantially the same, and the constituent elements can be combined as appropriate.

Exemplary embodiments of the present invention are described in detail with reference to the drawings. In descriptions of the drawings, the same constituent elements are assigned the same reference numerals, and a duplicated description is omitted.

First Embodiment

FIG. 1 is a circuit diagram illustrating a configuration of a resonant converter 1a (isolated resonant power supply device) according to a first embodiment of the present invention. The resonant converter 1a illustrated in FIG. 1 includes a pair of input terminals, namely, a first input terminal 2a and a second input terminal 2b (hereinafter also collectively referred to as an input terminal 2 unless specifically referred to otherwise), a pair of output terminals, namely, a first output terminal 3a and a second output terminal 3b (hereinafter also collectively referred to as an output terminal 3 unless specifically referred to otherwise), a resonant inverter 4a, and a resonant rectifier 5a. The resonant converter 1a converts an input voltage (DC voltage) V1 input to the input terminal 2 into an output voltage (DC voltage) V2 and outputs the output voltage V2 from the output terminal 3. In the resonant converter 1a, the input voltage V1 and an input current i1 are input to the input terminal 2, and the output voltage V2 and a load current i2 are output from the output terminal 3.

The resonant inverter 4a includes inverter circuits each including one switch and one input capacitor. The switches are a switch 11 (first switch) and a switch 15 (second switch), and the input capacitors are an input capacitor 6 and an input capacitor 12. The resonant inverter 4a includes a first coil 7, a second coil 13, a first capacitor 8 (first capacitive element), a second capacitor 14 (second capacitive element) and further includes a fourth coil 9, a fourth capacitor 10 (fourth capacitive element), a fifth coil 16, and a fifth capacitor 17 (fifth capacitive element). The resonant converter 1a is configured on the basis of a circuit system for step-down resonant converters, for example, and converts the input voltage V1 input to the input terminal 2 into an AC voltage.

The inverter circuits are a first inverter circuit and a second inverter circuit. The first inverter circuit includes the input capacitor 6, the switch 11, the first capacitor 8, the first coil 7, the fourth capacitor 10, and the fourth coil 9. The second inverter circuit includes the input capacitor 12, the switch 15, the second capacitor 14, the second coil 13, the fifth capacitor 17, and the fifth coil 16. The first switch 11 and the second switch 15 are alternately turned on and off at the same frequency but with a phase difference of 180 degrees.

Power is transmitted from the resonant inverter 4a to the resonant rectifier 5a via a transformer 18. The transformer 18 has a primary-side winding that is included in the resonant inverter 4a and a secondary-side winding that is included in the resonant rectifier 5a. The primary-side winding includes a first winding and a second winding, and further includes a center tap that is provided between the first winding and the second winding and that is directly connected to the first input terminal 2a.

One end of the first winding is connected to one end of the first coil 7, and the other end of the first winding, which is the center tap, is connected to the first input terminal 2a, to one end of the input capacitor 6, and to one end of the input capacitor 12. One end of the second winding is connected to one end of the second coil 13. The other end of the first coil 7 is connected to the drain of the first switch 11, to one end of the first capacitor 8, and to one end of the fourth coil 9. The source of the first switch 11 is connected to the other end of the first capacitor 8, to the other end of the input capacitor 6, to one end of the fourth capacitor 10, and to the input terminal 2b. The other end of the fourth coil 9 is connected to the other end of the fourth capacitor 10. That is, the portion from the drain to the source of the first switch 11 and the first capacitor 8 are connected in parallel. The series connection of the fourth coil 9 and the fourth capacitor 10 is connected in parallel to the portion from the drain to the source of the first switch 11. The first switch 11 includes a body diode. The cathode of the body diode is connected to the drain of the first switch 11, and the anode thereof is connected to the source of the first switch 11. The gate of the first switch 11 is connected to a control circuit not illustrated. Note that the first capacitor 8 may be formed of the parasitic capacitance of the first switch 11.

The first capacitor 8 and the first coil 7 constitute a first resonant circuit, and the first resonant circuit is built in the first inverter circuit. In other words, the first inverter circuit that includes the first switch 11, the first winding of the transformer 18, and the first resonant circuit that includes the first capacitor 8 and the first coil 7. The fourth coil 9 and the fourth capacitor 10 constitute a third resonant circuit, and the third resonant circuit is also built in the first inverter circuit.

The other end of the second coil 13 is connected to the drain of the second switch 15, to one end of the second capacitor 14, and to one end of the fifth capacitor 17. The source of the second switch 15 is connected to the other end of the second capacitor 14, to the other end of the input capacitor 12, to one end of the fifth coil 16, and to the input terminal 2b. The other end of the fifth coil 16 is connected to the other end of the fifth capacitor 17. That is, the portion from the drain to the source of the second switch 15 and the second capacitor 14 are connected in parallel. The series connection of the fifth coil 16 and the fifth capacitor 17 is connected in parallel to the portion from the drain to the source of the second switch 15. The second switch 15 includes a body diode. The cathode of the body diode is connected to the drain of the second switch 15, and the anode thereof is connected to the source of the second switch 15. The gate of the second switch 15 is connected to a control circuit not illustrated. Note that the second capacitor 14 may be formed of the parasitic capacitance of the second switch 15.

The second capacitor 14 and the second coil 13 constitute a second resonant circuit, and the second resonant circuit is built in the second inverter circuit. In other words, the second inverter circuit that includes the second switch 15, the second winding of the transformer 18, and the second resonant circuit that includes the second capacitor 14 and the second coil 13. The fifth coil 16 and the fifth capacitor 17 constitute a fourth resonant circuit, and the fourth resonant circuit is also built in the second inverter circuit.

Here, the switches 11 and 15 each include the reverse conduction diode relative to the direction from the input terminal 2b to the input terminal 2a and the capacitance between the input terminals 2b and 2a. The capacitance between the input terminals 2b and 2a included in the switch 11 and that included in the switch 15 are considered to be respectively included in the first capacitor 8 and the second capacitor 14.

The resonant rectifier 5a has inverter sections, and the inverter sections respectively include rectifier diodes 26 and 33, resonant coils 22 and 29, resonant capacitors 23 and 30, resonant coils 24 and 31, and resonant capacitors 25 and 32. It is assumed that the resonant capacitors 25 and 32 respectively include the junction capacitances of the rectifier diodes 26 and 33. The inverter sections include an output smoothing capacitor 27 that is coupled to the output terminals 3a and 3b. The resonant rectifier 5a receives an AC voltage generated by the resonant inverter 4a, converts the AC voltage into the output voltage V2, and outputs the output voltage V2 to the output terminal 3. The secondary-side winding of the transformer 18, which is included in the resonant rectifier 5a, includes a third winding and a fourth winding. One end of the third winding is connected to one end of a capacitor 21, and one end of the fourth winding is connected to one end of a capacitor 28. The center tap between the third winding and the fourth winding is connected to one end of the resonant capacitor 23, to one end of the resonant capacitor 30, to one end of the resonant coil 24, to one end of the resonant coil 31, to the cathodes of the rectifier diodes 26 and 33, to one end of the resonant capacitor 25, to one end of the resonant capacitor 32, to one end of the output smoothing capacitor 27, and to the second output terminal 3b. Such a resonant rectifier is connected to the resonant inverter 4a, thereby enabling downsizing of the resonant power supply device as a whole.

In the first embodiment, the first input terminal 2a is connected between the first winding and the second winding of the transformer 18 (that is, to the center tap). Accordingly, the transformer 18 is placed on the stage before the capacitors 21 and 28. A voltage applied to the transformer 18 is determined on the basis of the input voltage V1 and the ratio between the self-inductance and leakage inductance of the isolation transformer 18 and the inductance of the coil 7 or that of the coil 13 and does not depend on the inductance or capacitance of the resonant rectifier 5a. Therefore, the saturation condition and the turns ratio of the transformer 18 can be easily determined. Setting performed so that the drain-source impedance of the switch 11 or 15 becomes low at the frequency twice the drive frequency Fs and so that the drain-source impedance becomes high at the frequency equal to the drive frequency Fs and at the frequency three times the drive frequency Fs does not necessarily mean that the operating voltage of the switch 11 or 15 is decreased. In order to decrease the operating voltage of the switch 11 or 15 in the resonant inverter 4a, setting needs to be performed so that the difference between the frequencies at two maximum points of the impedance (the difference between the lowest resonance frequency F1, which corresponds to the first resonance point, and the highest resonance frequency F3, which corresponds to the third resonance point) is equal to or larger than the drive frequency Fs and smaller than the frequency twice the drive frequency Fs. The two maximum points of the impedance are generated by the first resonant circuit and the second resonant circuit. In the first embodiment, the second resonance frequency F2 is generated by the third resonant circuit and the fourth resonant circuit. In the inverter circuits, the first coil 7, the first capacitor 8, the fourth capacitor 10, the fourth coil 9, the second coil 13, the second capacitor 14, the fifth capacitor 17, and the fifth coil 16 are configured so as to satisfy 1Fs≤(F3−F1)<2Fs on the basis of the following equations. That is, the coils and capacitors that constitute the first resonant circuit, the second resonant circuit, the third resonant circuit, and the fourth resonant circuit are configured. This configuration is described below with reference to FIG. 5 and FIG. 6.

The operating points are determined as follows. The resonant inverter 4a has the same basic configuration as that of a single-ended inverter even if the resonant inverter 4a is a push-pull inverter. This is because the switches 11 and 15 are complementarily turned on and off. When the switch 11 is turned off, the switch 15 is turned on, and therefore, the operations of the fourth coil 9 and the fourth capacitor 10 and the operations of the fifth coil 16 and the fifth capacitor 17, from which the second resonance frequency is determined, are considered to be the same as those of a single-ended inverter. Now, one section in the first embodiment is focused. The inductance of the first coil 7 is denoted by $L_F$, the capacitance of the first capacitor 8 is denoted by $C_F$, and the parallel impedance formed of $L_F$ and $C_F$ is denoted by $Z_F$. The inductance of the fourth coil 9 is denoted by $L_{MR}$, the capacitance of the fourth capacitor 10 is denoted by $C_{MR}$, and the series impedance formed of $L_{MR}$ and $C_{MR}$ is denoted by $Z_{MR}$. Then, the input impedance Zin is expressed by equation (1).

$$\frac{1}{Zin} = \frac{1}{Z_F} + \frac{1}{Z_{MR}} \tag{1}$$

Here, the parallel impedance $Z_F$ is expressed by equation (2).

$$\frac{1}{Z_F} = \frac{1}{sL_F} + sC_F = \frac{1+s^2 L_F \cdot C_F}{sL_F} \tag{2}$$

$$Z_F = \frac{sL_F}{1+s^2 \cdot L_F \cdot C_F}$$

The series impedance $Z_{MR}$ is expressed by equation (3).

$$Z_{MR} = sL_{MR} + \frac{1}{sC_{MR}} = \frac{1+s^2 \cdot L_{MR} \cdot C_{MR}}{sC_{MR}} \tag{3}$$

Therefore, equation (1) that expresses Zin can be modified to equation (4).

$$\frac{1}{Zin} = \frac{1+s^2 \cdot L_F \cdot C_F}{sL_F} + \frac{sC_{MR}}{1+s^2 \cdot L_{MR} \cdot C_{MR}} \tag{4}$$

When equation (4) is rearranged to express Zin by using an angular frequency ω, Zin is expressed by equation (5).

$$Zin = \frac{i \cdot \omega \cdot L_F \cdot (1 - \omega^2 \cdot C_{MR} \cdot L_{MR})}{1 - \omega^2 \cdot \left(\frac{L_F \cdot C_F + L_{MR} \cdot}{C_{MR} + L_F \cdot C_{MR}}\right) + \omega^4 \cdot (L_F \cdot C_F \cdot L_{MR} \cdot C_{MR})} \tag{5}$$

Here, the resonance frequency based on $L_F$ and $C_F$ is defined by equation (6).

$$\omega_{FF} = \frac{1}{\sqrt{L_F \cdot C_F}} \tag{6}$$

The resonance frequency based on $L_{MR}$ and $C_{MR}$ is defined by equation (7).

$$\omega_{MM} = \frac{1}{\sqrt{L_{MR} \cdot C_{MR}}} \tag{7}$$

The resonance frequency based on $L_F$ and $C_{MR}$ is defined by equation (8).

$$\omega_{FM} = \frac{1}{\sqrt{L_F \cdot C_{MR}}} \tag{8}$$

Then, equation (5) can be modified to equation (9).

$$Zin = \frac{i \cdot \omega \cdot L_F \cdot \left(1 - \frac{\omega^2}{\omega_{MM}^2}\right)}{1 - \omega^2 \cdot \left(\frac{1}{\omega_{FF}^2} + \frac{1}{\omega_{MM}^2} + \frac{1}{\omega_{FM}^2}\right) + \omega^4 \cdot \left(\frac{1}{\omega_{FF}^2 \cdot \omega_{MM}^2}\right)} \tag{9}$$

The input impedance Zin is at a minimum on condition that the numerator is equal to zero, which is expressed by equation (10).

$$\omega \cdot L_F \cdot \left(1 - \frac{\omega^2}{\omega_{MM}^2}\right) = 0 \tag{10}$$

A condition that the input impedance Zin is at a minimum at the frequency equal to zero and at the frequency twice the drive frequency is set. Here, the drive frequency is denoted by Fs, and the angular frequency is expressed by $\omega_s = 2\pi Fs$. Then, the condition is expressed by equations (11).

$$\omega = 0 \tag{11}$$

$$\omega = \omega_{MM} = \frac{1}{\sqrt{L_{MR} \cdot C_{MR}}} = 2 \cdot \omega_S$$

On the other hand, the input impedance Zin is at a maximum on condition that the denominator is equal to zero, which is expressed by equation (12).

$$1 - \omega^2 \cdot \left( \frac{1}{\omega_{FF}^2} + \frac{1}{\omega_{MM}^2} + \frac{1}{\omega_{FM}^2} \right) + \omega^4 \cdot \left( \frac{1}{\omega_{FF}^2 \cdot \omega_{MM}^2} \right) = 0 \quad (12)$$

In order to simplify this biquadratic equation, α and β are respectively defined by equations (13) and (14).

$$\alpha = \left( \frac{\omega_{FF}^2 \cdot \omega_{MM}^2}{2} \right) \cdot \left( \frac{1}{\omega_{FF}^2} + \frac{1}{\omega_{MM}^2} + \frac{1}{\omega_{FM}^2} \right) \quad (13)$$

$$\beta = \frac{2}{\left( \frac{1}{\omega_{FF}^2} + \frac{1}{\omega_{MM}^2} + \frac{1}{\omega_{FM}^2} \right)} \quad (14)$$

Then, equation (12) can be modified to equation (15).

$$1 - \omega^2 \cdot \frac{2}{\beta} + \omega^4 \cdot \frac{1}{\alpha \beta} = 0 \quad (15)$$

Here, from equations (13) and (14), equations (16) and (17) below are obtained.

$$\frac{2}{\beta} = \frac{1}{\omega_{FF}^2} + \frac{1}{\omega_{FM}^2} + \frac{1}{\omega_{MM}^2} \quad (16)$$

$$\frac{1}{\alpha \beta} = \frac{1}{\omega_{FF}^2 \cdot \omega_{MM}^2} \quad (17)$$

Therefore, the solution of the biquadratic equation (15) is expressed by equation (18).

$$\omega = \begin{bmatrix} \sqrt{\alpha \beta \cdot \left( \frac{1}{\beta} + \frac{\sqrt{\frac{\alpha \beta - \beta^2}{\alpha \beta}}}{\beta} \right)} \\ -\sqrt{\alpha \beta \cdot \left[ \frac{1}{\beta} + \frac{1}{\beta} \cdot \sqrt{\frac{1}{\alpha \beta} \cdot (\alpha \beta - \beta^2)} \right]} \\ \sqrt{\alpha \beta \cdot \left( \frac{1}{\beta} - \frac{\sqrt{\frac{\alpha \beta - \beta^2}{\alpha \beta}}}{\beta} \right)} \\ -\sqrt{\alpha \beta \cdot \left[ \frac{1}{\beta} - \frac{1}{\beta} \cdot \sqrt{\frac{1}{\alpha \beta} \cdot (\alpha \beta - \beta^2)} \right]} \end{bmatrix} \quad (18)$$

Here, ω has a positive value, and therefore, the first resonance frequency and the third resonance frequency at which the input impedance Zin is at a maximum are calculated and expressed by equations (19) and (20).

$$\omega_1 = \sqrt{\alpha \left( 1 - \sqrt{1 - \frac{\beta}{\alpha}} \right)} \quad (19)$$

$$\omega_3 = \sqrt{\alpha \left( 1 + \sqrt{1 - \frac{\beta}{\alpha}} \right)} \quad (20)$$

In order to set the input impedance Zin so that the first resonance frequency is equal to the drive frequency and so that the third resonance frequency is three times the drive frequency, the first resonance frequency and the third resonance frequency are defined by equations (21).

$$\omega_1 = \omega_s$$
$$\omega_3 = 3 \cdot \omega_s \quad (21)$$

$$\omega_s = \sqrt{\alpha \left( 1 - \sqrt{1 - \frac{\beta}{\alpha}} \right)} \quad 3\omega_s = \sqrt{\alpha \left( 1 + \sqrt{1 - \frac{\beta}{\alpha}} \right)} \quad (22)$$

Squaring the both sides of equations (22) yields equations (23).

$$\omega_s^2 = \alpha \left( 1 - \sqrt{1 - \frac{\beta}{\alpha}} \right) \quad 9 \cdot \omega_s^2 = \alpha \left( 1 + \sqrt{1 - \frac{\beta}{\alpha}} \right) \quad (23)$$

$$\alpha - \omega_s^2 = \alpha \cdot \sqrt{1 - \frac{\beta}{\alpha}} \quad 9 \cdot \omega_s^2 - \alpha = \alpha \cdot \sqrt{1 - \frac{\beta}{\alpha}} \quad (24)$$

The right side of the left equation among equations (24) is equal to the right side of the right equation among equations (24). Therefore, β is eliminated, and α is calculated and expressed by equation (25).

$$\alpha = 5 \cdot \omega_s^2 \quad (25)$$

Equation (25) is substituted into the left equation among equations (23), and β is calculated and expressed by equation (26).

$$\beta = \frac{9 \cdot \omega_s^2}{5} \quad (26)$$

Substituting equations (26) and (11) into equation (14) yields equation (27).

$$\frac{9 \cdot \omega_s^2}{5} = \frac{2}{\left[ \frac{1}{\omega_{FF}^2} + \frac{1}{(2\omega_s)^2} + \frac{1}{\omega_{FM}^2} \right]} \quad (27)$$

Solving equation (27) in terms of $\omega_{FF}^2$ yields equation (28).

$$\omega_{FF}^2 = -\frac{1}{\frac{1}{\omega_{FM}^2} - \frac{31}{36 \cdot \omega_s^2}} \quad (28)$$

Substituting equations (25) and (11) into equation (13) yields equation (29).

$$5 \cdot \omega_s^2 = \left[ \frac{\omega_{FF}^2 \cdot (2\omega_s)^2}{2} \right] \cdot \left[ \frac{1}{\omega_{FF}^2} + \frac{1}{(2\omega_s)^2} + \frac{1}{\omega_{FM}^2} \right] \quad (29)$$

Substituting equation (28) into equation (29) yields equation (30).

$$5 \cdot \omega_s^2 = \left[ \frac{-\frac{1}{\frac{1}{\omega_{FM}^2} - \frac{31}{36 \cdot \omega_s^2}} \cdot (2\omega_s)^2}{2} \right] \cdot \left[ \frac{1}{\frac{1}{\frac{1}{\omega_{FM}^2} - \frac{31}{36 \cdot \omega_s^2}}} + \frac{1}{(2\omega_s)^2} + \frac{1}{\omega_{FM}^2} \right] \quad (30)$$

Solving equation (30) in terms of $\omega_{FM}$ yields equation (31) because the resonance frequency has a positive value.

$$\omega_{FM} = \sqrt{\frac{12}{5}} \cdot \omega_s \quad (31)$$

Equation (31) is substituted into equation (28), and, because the resonance frequency has a positive value, $\omega_{FF}$ is calculated and expressed by equation (32).

$$\omega_{FF} = 3/2 \cdot \omega_s \quad (32)$$

Equation (32) is substituted into equation (6), and $L_F$ is calculated and expressed by equation (33).

$$L_F = \frac{1}{9 \cdot \pi^2 \cdot C_F \cdot f_s^2} \quad (33)$$

Substituting equation (31) into equation (8) yields equation (34).

$$C_{MR} = \frac{5}{12 \cdot L_F \cdot \omega_s^2} \quad (34)$$

Equation (33) is substituted into equation (34), and $C_{MR}$ is calculated and expressed by equation (35).

$$C_{MR} = \frac{15 \cdot C_F}{16} \quad (35)$$

From equation (11), $\omega_s$ is expressed by equation (36).

$$\omega_s = \frac{1}{2\sqrt{L_{MR} \cdot C_{MR}}} \quad (36)$$

Equation (35) is substituted into equation (36), and $L_{MR}$ is calculated and expressed by equation (37).

$$L_{MR} = \frac{1}{15 \cdot \pi^2 \cdot C_F \cdot f_s^2} \quad (37)$$

In accordance with the procedure described above, by defining the drive frequency Fs and the first capacitor 8 ($C_F$) that includes the drain-source (collector-emitter) capacitance of the switch 11, the fourth capacitor 10 ($C_{MR}$), the first coil 7 ($L_F$) and the fourth coil 9 ($L_{MR}$) can be determined.

Figure 5:
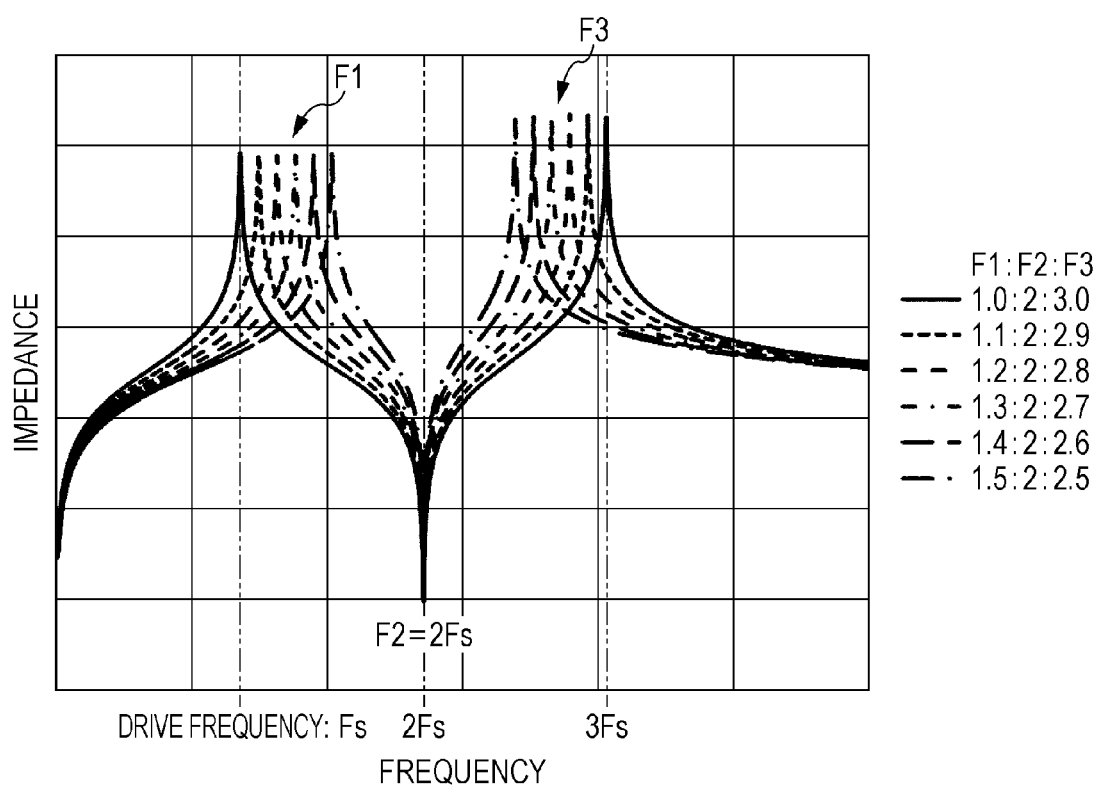
FIG. 5 is an explanatory diagram illustrating the drain impedance property seen from each switch in a resonant inverter according to an embodiment of the present invention.

The results obtained by determining the first capacitor 8 ($C_F$) that includes the drain-source capacitance of the switch 11 first and calculating the drain-source (collector-emitter) impedance on the basis of the above-described method are shown in Table 1, and the drain-source impedance characteristics in this case is illustrated in FIG. 5. The switch 15 is a push-pull inverter, and therefore, the procedure is similarly applied while the second coil 13 is assumed to be $L_F$, the second capacitor 14 is assumed to be $C_F$, the fifth coil 16 is assumed to be $L_{MR}$, and the fifth capacitor 17 is assumed to be $C_{MR}$.

Here, as the resonance condition, the second resonance frequency at which the input impedance Zin is at a minimum is denoted by F2, and the resonance point that corresponds to the second resonance frequency F2 is fixed. The first resonance frequency at which the input impedance is at a maximum is denoted by F1, and the third resonance frequency at which the input impedance is at a maximum is denoted by F3. When only the resonant inverter is taken into consideration, the input impedance Zin is equal to the drain-source impedance of the switch 11 or 15.

Table 1 below shows the calculated values of the resonant coils and the resonance capacitances, and the points F1 and F3 at which the input impedance is at a maximum and the point F2 at which the input impedance is at a minimum ($C_F$ is set to 220 pF, for example).

TABLE 1

| F1 | F2 | F3 | F3 − F1 | $L_F$ | $C_F$ | $L_{MR}$ | $C_{MR}$ |
|---|---|---|---|---|---|---|---|
| 1Fs | 2Fs | 3Fs | 2Fs | $L_F := \frac{1}{9 \cdot \pi^2 \cdot C_F \cdot f_s^2}$ | $C_F := 200 \cdot p$ | $L_{MR} := \frac{1}{15 \cdot \pi^2 \cdot C_F \cdot f_s^2}$ | $C_{MR} := \frac{15 \cdot C_F}{16}$ |
| 1.1Fs | 2Fs | 2.9Fs | 1.8Fs | $L_F := \frac{10000}{101761 \cdot \pi^2 \cdot C_F \cdot f_s^2}$ | $C_F := 200 \cdot p$ | $L_{MR} := \frac{10000}{123039 \cdot \pi^2 \cdot C_F \cdot f_s^2}$ | $C_{MR} := \frac{123039 \cdot C_F}{160000}$ |
| 1.2Fs | 2Fs | 2.8Fs | 1.6Fs | $L_F := \frac{625}{7056 \cdot \pi^2 \cdot C_F \cdot f_s^2}$ | $C_F := 200 \cdot p$ | $L_{MR} := \frac{625}{6144 \cdot \pi^2 \cdot C_F \cdot f_s^2}$ | $C_{MR} := \frac{384 \cdot C_F}{625}$ |
| 1.3Fs | 2Fs | 2.7Fs | 1.4Fs | $L_F := \frac{10000}{123201 \cdot \pi^2 \cdot C_F \cdot f_s^2}$ | $C_F := 200 \cdot p$ | $L_{MR} := \frac{10000}{75999 \cdot \pi^2 \cdot C_F \cdot f_s^2}$ | $C_{MR} := \frac{75999 \cdot C_F}{160000}$ |

TABLE 1-continued

| F1 | F2 | F3 | F3 − F1 | $L_F$ | $C_F$ | $L_{MR}$ | $C_{MR}$ |
|---|---|---|---|---|---|---|---|
| 1.4Fs | 2Fs | 2.6Fs | 1.2Fs | $L_F := \dfrac{625}{8281 \cdot \pi^2 \cdot C_F \cdot f_s^2}$ | $C_F := 200 \cdot p$ | $L_{MR} := \dfrac{625}{3519 \cdot \pi^2 \cdot C_F \cdot f_s^2}$ | $C_{MR} := \dfrac{3519 \cdot C_F}{10000}$ |
| 1.5Fs | 2Fs | 2.5Fs | 1Fs | $L_F := \dfrac{64}{225 \cdot C_F - (2\pi \cdot f_s)^2}$ | $C_F := 200 \cdot p$ | $L_{MR} := \dfrac{16}{63 \cdot \pi^2 \cdot C_F \cdot f_s^2}$ | $C_{MR} := \dfrac{63 \cdot C_F}{256}$ |

Figure 6:
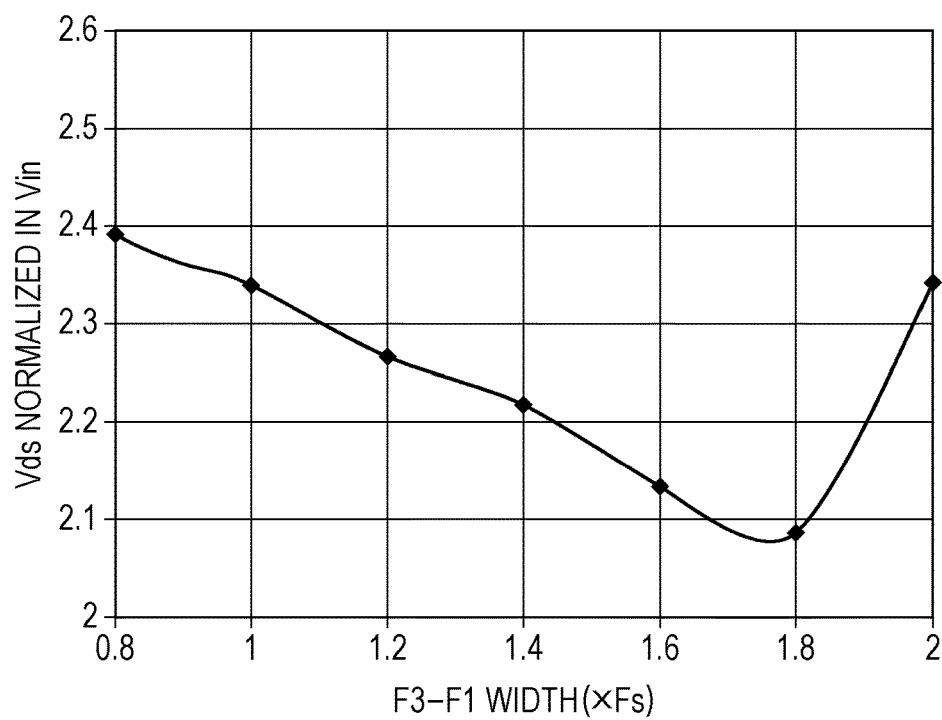
FIG. 6 is an explanatory diagram illustrating a relation between a frequency width F3–F1 at the maximum point of the impedance and the switch voltage when the minimum point of the impedance of each switch is fixed to 2Fs.
Figure 7:
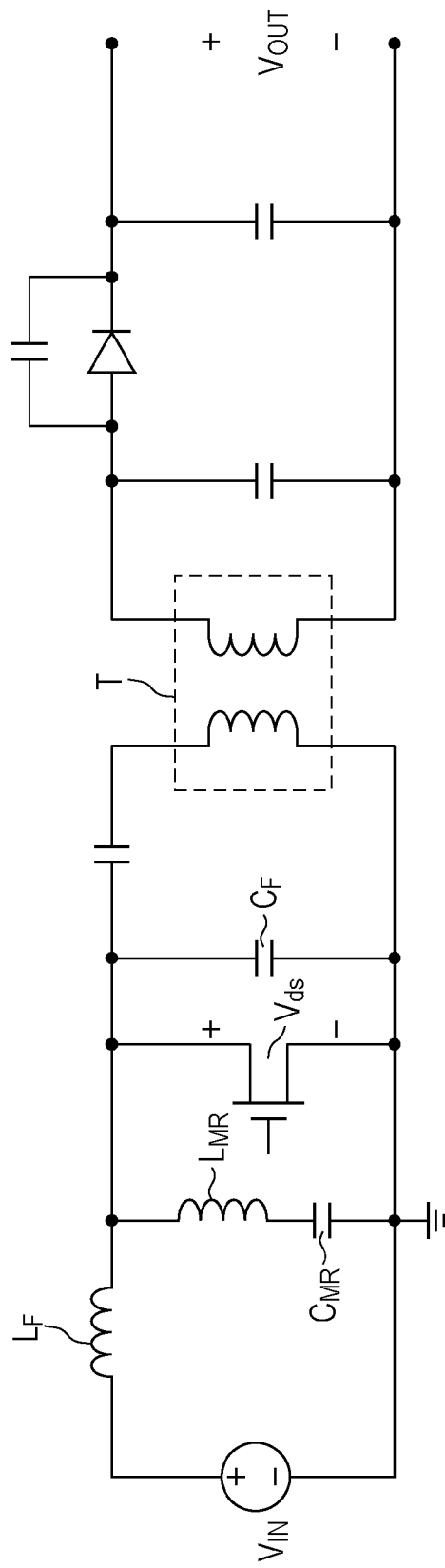
FIG. 7 is an explanatory diagram illustrating an example of an isolated resonant converter according to the related art.
Figure 8:
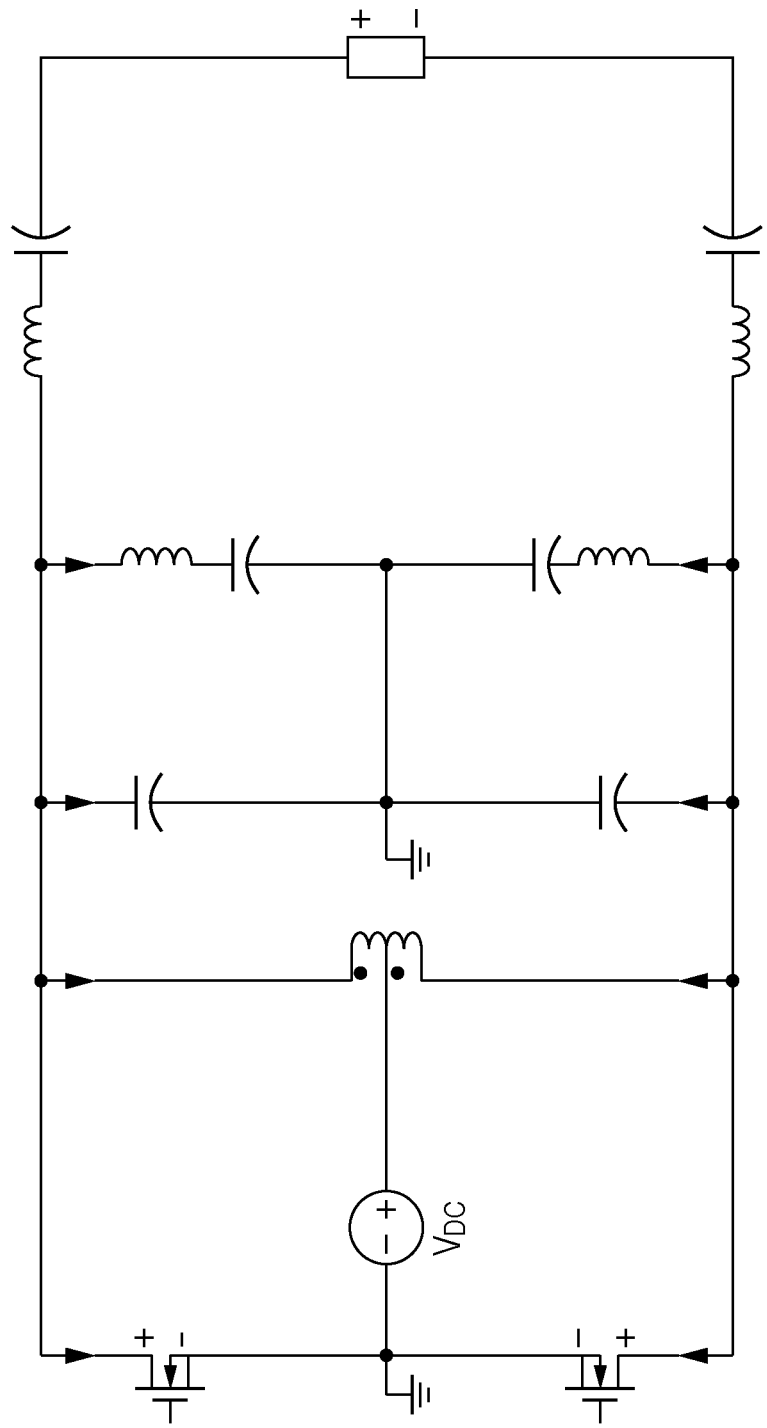
FIG. 8 is an explanatory diagram illustrating an example of a push-pull resonant inverter according to the related art.

FIG. 6 illustrates a relation between the drain-source voltage of the switch 11 or 15 and the resonance frequency width F3–F1. The resonance frequency width is the difference between the third resonance frequency F3 and the first resonance frequency F1 at which the drain-source impedance of the switch 11 or 15 is at a maximum. The horizontal axis represents the resonance frequency width F3–F1 when the drive frequency Fs is assumed to correspond to the value "1", and the vertical axis represents the drain-source voltage of the switch 11 or 15.

As seen from FIG. 6, in a case where the resonance frequency width F3–F1 is made smaller than the value twice the drive frequency Fs (in a case where the value on the horizontal axis is smaller than 2), the drain-source voltage of the switch 11 or 15 becomes lower to form the minimum point. In the case where the resonance frequency width F3-F1 is made smaller than the value twice the drive frequency Fs (in the case where the value on the horizontal axis is smaller than 2) and if the resonance frequency width F3–F1 is made equal to or larger than the drive frequency Fs (if the value on the horizontal axis is equal to or larger than 1), the drain-source voltage of the switch 11 or 15 is lower than in a case where the resonance frequency width F3–F1 is set to the value twice the drive frequency Fs. Specifically, the drain-source voltage of the switch 11 or 15 when the resonance frequency width F3–F1 is twice the drive frequency Fs is 2.34 V. The drain-source voltage of the switch 11 or 15 when the resonance frequency width F3–F1 is 1.8 times the drive frequency Fs is 2.08 V. The drain-source voltage of the switch 11 or 15 when the resonance frequency width F3–F1 is 1.6 times the drive frequency Fs is 2.13 V. The drain-source voltage of the switch 11 or 15 when the resonance frequency width F3–F1 is 1.4 times the drive frequency Fs is 2.22 V. The drain-source voltage of the switch 11 or 15 when the resonance frequency width F3–F1 is 1.2 times the drive frequency Fs is 2.26 V. The drain-source voltage of the switch 11 or 15 when the resonance frequency width F3–F1 is equal to the drive frequency Fs is 2.33 V. Therefore, in order to decrease the drain-source voltage of the switch, the resonance frequency width F3–F1 is made equal to or larger than the drive frequency Fs and is made smaller than the value twice the drive frequency Fs. Then, the drain-source voltage of the switch can be made lower than in a case where the resonance frequency width F3–F1 is set to the value twice the drive frequency Fs, resulting in a decrease in the operating voltage of the switch. This is expressed by the equation, 1Fs≤(F3−F1)<2Fs. For a simplified adjustment, in order to suppress the drain-source voltage of the switch to a voltage 2.3 times or lower than the input voltage, the resonance frequency width F3–F1 is set to 1.5Fs, which is substantially a middle value between 1.1Fs and 1.9Fs. Then, variations in the resonance frequency width F3–F1 can be handled.

As described above, the saturation condition and the turns ratio of the transformer can be determined while the voltage applied to the transformer is not affected by the resonant rectifier unlike resonant inverters according to the related art. Therefore, it is possible to provide a resonant inverter for which the resonance frequencies can be easily adjusted. The resonance capacitances $C_F$ of the first capacitor 8 and the second capacitor 14 that respectively include the drain-source capacitances of the switches 11 and 15 are determined, and calculations are performed using the disclosed method to thereby easily calculate the drain-source impedances of the switches 11 and 15. The value of the resonance frequency width F3–F1 is selected on the basis of the first resonance frequency F1 and the third resonance frequency F3 at which the impedance is at a maximum so as to be within the allowed range of variation. As a result, the drain-source voltages of the switches are lower than in a case where the resonance frequency width F3–F1 is made equal to 2Fs. Consequently, a reliable resonant inverter that does not affect the life of the switches as much as possible can be implemented.

Second Embodiment

Figure 2:
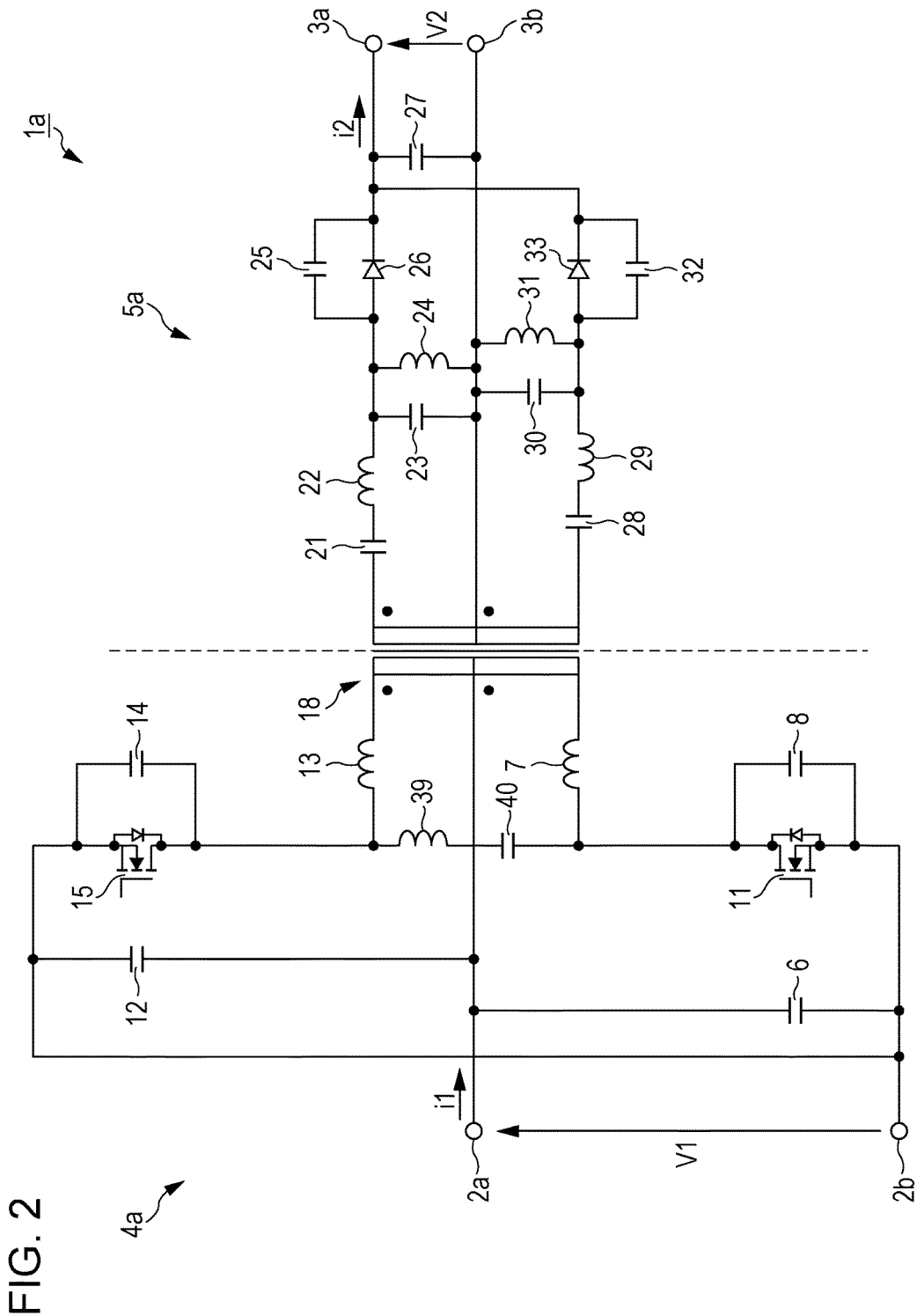
FIG. 2 illustrates an isolated resonant converter circuit according to a second embodiment of the present invention.

FIG. 2 illustrates a resonant converter according to a second embodiment of the present invention. The second embodiment is different from the first embodiment in that, in the resonant inverter 4a, the third or fourth resonant circuit, based on which the second resonance frequency F2 is determined as described in the first embodiment, is configured by using a fifth resonant circuit. Specifically, in the first embodiment, the third resonant circuit constituted by the fourth coil 9 and the fourth capacitor 10 and the fourth resonant circuit constituted by the fifth coil 16 and the fifth capacitor 17 constitute the resonant circuit based on which the second resonance frequency F2 is determined. However, in the second embodiment, the fifth resonant circuit is constituted by a third coil 39 and a third capacitor 40 (third capacitive element). One end of the third capacitor 40 is connected to the other end of the first coil 7 and to one end of the first winding of the transformer 18. The other end of the third capacitor 40 is connected to one end of the third coil 39. The other end of the third coil 39 is connected to the other end of the second coil 13 and to one end of the second winding of the transformer 18. The configuration of the remaining portion is the same as that of the first embodiment. Accordingly, the number of coils and capacitors that constitute the resonant circuit, based on which the second resonant frequency F2 is determined, can be decreased. As a result, downsizing and cost reduction of the circuit and device can be achieved. Further, the third coil 39 and the third capacitor 40 that constitute the fifth resonant circuit are shared by the first inverter circuit and the second inverter circuit, and therefore, an adjustment of the resonance frequencies for determining the second resonance frequency F2 needs to be made only for one location. Accordingly, an adjustment of the resonance frequencies can be simplified.

Third Embodiment

Figure 3:
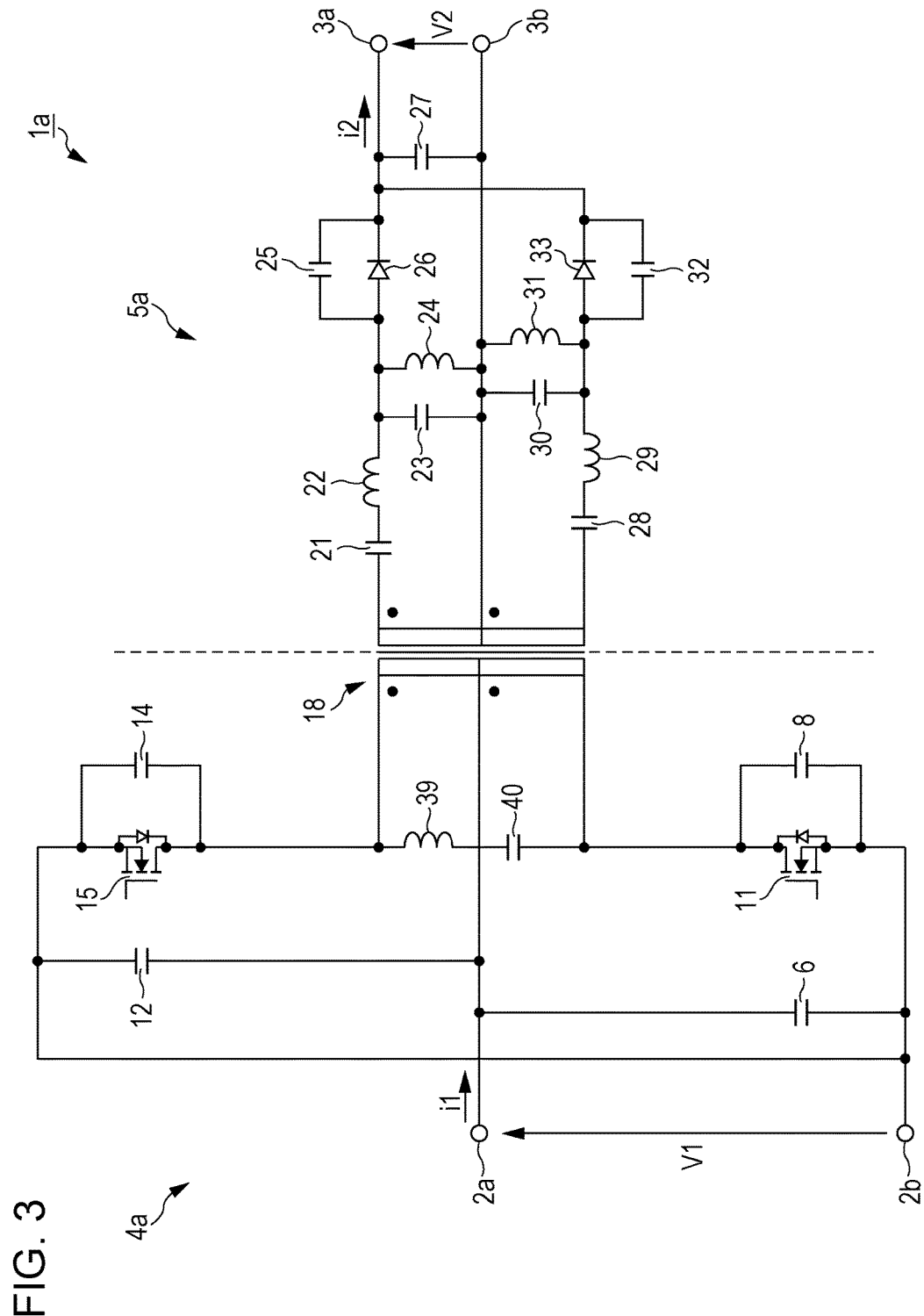
FIG. 3 illustrates an isolated resonant converter circuit according to a third embodiment of the present invention.

FIG. 3 illustrates a resonant converter circuit according to a third embodiment of the present invention. The third embodiment is different from the second embodiment in that the first coil 7 and the second coil 13 are replaced by the leakage inductance of the transformer 18. The configuration of the remaining portion is the same as that of the second embodiment. One end of the first capacitor 8 is connected to the drain of the first switch 11, to one end of the third capacitor 40, and to one end of the first winding of the transformer 18. The other end of the first capacitor 8 is connected to the source of the first switch 11, to the input terminal 2b, and so on. One end of the second capacitor 14 is connected to the drain of the second switch 15, to one end of the third coil 39, and to one end of the second winding of the transformer 18. The other end of the second capacitor 14 is connected to the source of the second switch 15, to the input terminal 2b, and so on. In other words, the first inverter circuit that includes the first switch 11, the first winding of the transformer 18, and the first resonant circuit that includes the first capacitor 8 and the leakage inductance of the transformer 18. Also, the second inverter circuit that includes the second switch 15, the second winding of the transformer 18, and the second resonant circuit that includes the second capacitor 14 and the leakage inductance of the transformer 18. Two coils are further removed from the configuration of the second embodiment, thereby reducing the footprint. As a result, it is possible to implement a small resonant inverter and a small insulated resonant power supply device for which costs can be reduced. Even if the first coil 7 and the second coil 13 are replaced by the leakage inductance of the transformer 18, the resonant circuit, based on which the second resonance frequency F2 is determined, may be constituted by the third resonant circuit that is constituted by the fourth coil 9 and the fourth capacitor 10 or the fourth resonant circuit that is constituted by the fifth coil 16 and the fifth capacitor 17 instead of the fifth resonant circuit that is constituted by the third coil 39 and the third capacitor 40 (third capacitive element).

Fourth Embodiment

Figure 4:
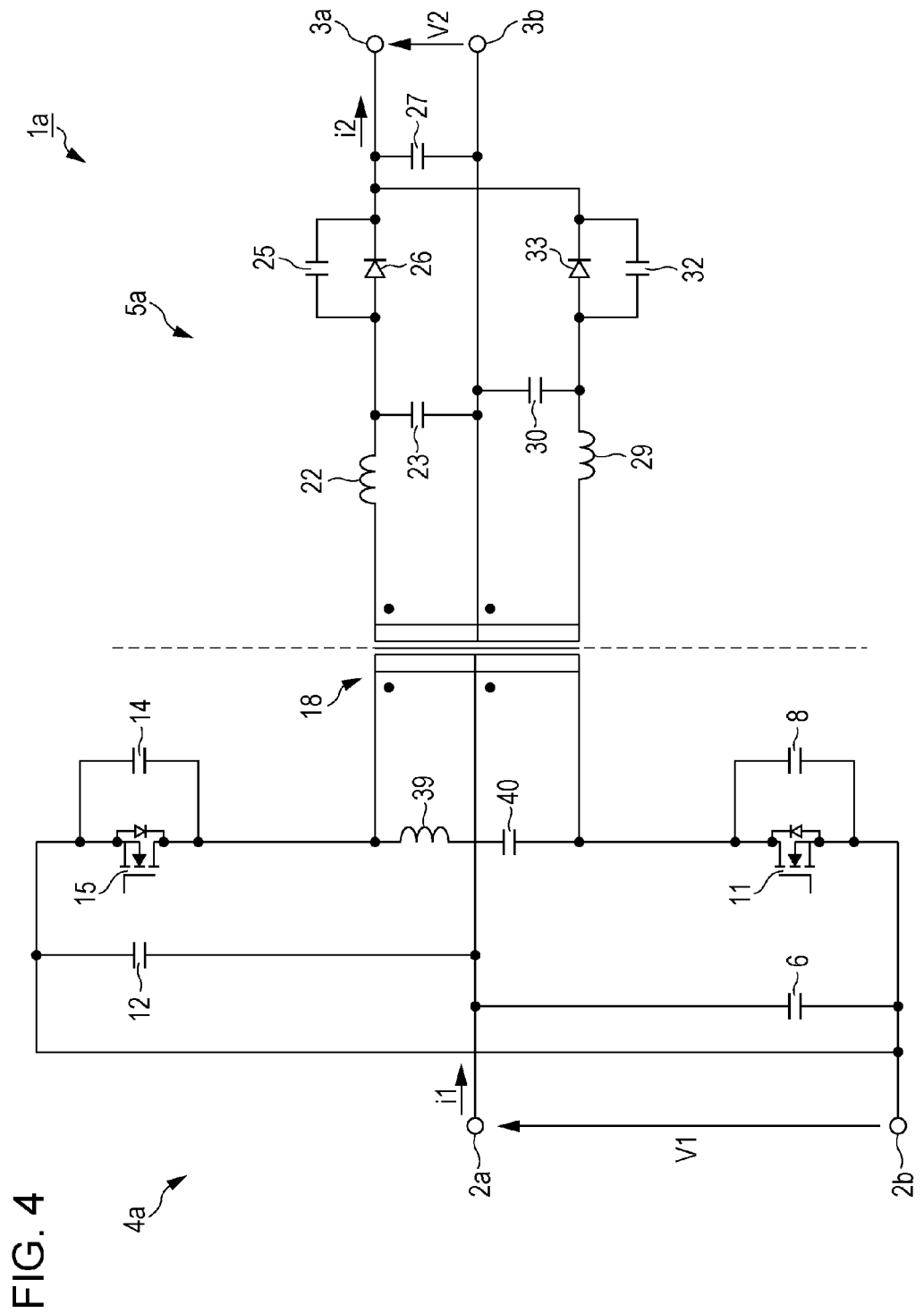
FIG. 4 illustrates an isolated resonant converter circuit according to a fourth embodiment of the present invention.

FIG. 4 illustrates a resonant converter according to a fourth embodiment of the present invention. The fourth embodiment is different from the third embodiment in that the resonant rectifier 5a is modified to a voltage step-up rectifier. The resonant rectifier 5a is adaptive to various types of rectifiers, such as a voltage step-down rectifier and a voltage step-up rectifier.

Although the resonant inverter and the resonant power supply device according to embodiments of the present invention are described above, the above descriptions of the exemplary embodiments are not restrictive, and various modifications can be made.

The first switch 11 and the second switch 15 are assumed to be field-effect transistors (FETs), for example, and the descriptions are given; however, the switches are not limited to these. The embodiments are also applicable to other switches, such as bipolar transistors.

The resonant inverter 4a is assumed to be of a voltage step-down type, for example, and the descriptions are given; however, the resonant inverter 4a is not limited to this. The embodiments are also applicable to a voltage step-up resonant inverter.

What is claimed is:
1. A resonant inverter comprising:
an input terminal to which an input voltage is applied;
a first switch and a second switch that are alternately turned on and off;
a transformer that includes a first winding and a second winding on a primary side;
a first resonant circuit that includes a first capacitive element and a first coil; and
a second resonant circuit that includes a second capacitive element and a second coil, wherein
the first switch, the first winding, and the first resonant circuit constitute a first inverter circuit,
the second switch, the second winding, and the second resonant circuit constitute a second inverter circuit,
the input terminal is connected between the first winding and the second winding of the transformer,
the first capacitive element is connected in parallel to the first switch,
the second capacitive element is connected in parallel to the second switch,
the first coil is placed between the first switch and the first winding, and
the second coil is placed between the second switch and the second winding.
2. The resonant inverter according to claim 1, further comprising:
a fifth resonant circuit that includes a third capacitive element and a third coil and that is placed between the first switch and the second switch.
3. The resonant inverter according to claim 1, further comprising:
a third resonant circuit that includes a series connection of a fourth coil and a fourth capacitive element, the series connection being placed parallel to the first switch; and
a fourth resonant circuit that includes a series connection of a fifth coil and a fifth capacitive element, the series connection being placed parallel to the second switch.
4. An insulated resonant power supply device, comprising:
the resonant inverter according to claim 1; and
a rectifier circuit placed on a secondary side of the transformer.
5. The resonant inverter according to claim 1, further comprising:
a fifth resonant circuit that includes a third capacitive element and a third coil and that is placed between the first switch and the second switch.
6. The resonant inverter according to claim 1, further comprising:
a third resonant circuit that includes a series connection of a fourth coil and a fourth capacitive element, the series connection being placed parallel to the first switch; and
a fourth resonant circuit that includes a series connection of a fifth coil and a fifth capacitive element, the series connection being placed parallel to the second switch.
7. The resonant inverter according to claim 2, wherein,
at least three resonance points are generated in response to resonance of the first resonant circuit, the second resonant circuit, and the fifth resonant circuit, the three resonance points including a first resonance point, a second resonance point, and a third resonance point, and
if a lowest resonance frequency that corresponds to the first resonance point is denoted by F1, a highest resonance frequency that corresponds to the third resonance point is denoted by F3, the second resonance point that corresponds to a resonance frequency between F1 and F3 is fixed, and
a drive frequency for driving the first switch or the second switch is denoted by Fs, then, $1Fs \leq (F3-F1) < 2Fs$ is satisfied.

8. The resonant inverter according to claim 3, wherein,
at least three resonance points are generated in response to resonance of the first resonant circuit, the second resonant circuit, and the third or fourth resonant circuit, the three resonance points including a first resonance point, a second resonance point, and a third resonance point, and
if a lowest resonance frequency that corresponds to the first resonance point is denoted by F1, a highest resonance frequency that corresponds to the third resonance point is denoted by F3, the second resonance point that corresponds to a resonance frequency between F1 and F3 is fixed, and
a drive frequency for driving the first switch or the second switch is denoted by Fs,
then, $1Fs \leq (F3-F1) < 2Fs$ is satisfied.

9. A resonant inverter comprising:
an input terminal to which an input voltage is applied;
a first switch and a second switch that are alternately turned on and off;
a transformer that includes a first winding and a second winding on a primary side;
a first resonant circuit that is formed of a first capacitive element and a leakage inductance of the transformer;
a second resonant circuit that is formed of a second capacitive element and the leakage inductance of the transformer;
a third resonant circuit that includes a series connection of a fourth coil and a fourth capacitive element, the series connection being placed parallel to the first switch; and
a fourth resonant circuit that includes a series connection of a fifth coil and a fifth capacitive element, the series connection being placed parallel to the second switch, wherein
the first switch, the first winding, and the first resonant circuit constitute a first inverter circuit,
the second switch, the second winding, and the second resonant circuit constitute a second inverter circuit, and
the input terminal is connected between the first winding and the second winding of the transformer.

10. The resonant inverter according to claim 9, wherein
the first capacitive element is connected in parallel to the first switch and has one end that is connected to one end of the first winding, and
the second capacitive element is connected in parallel to the second switch and has one end that is connected to one end of the second winding.

11. The resonant inverter according to claim 9, further comprising:
a fifth resonant circuit that includes a third capacitive element and a third coil and that is placed between the first switch and the second switch.

12. The resonant inverter according to claim 9, wherein,
at least three resonance points are generated in response to resonance of the first resonant circuit, the second resonant circuit, and the third or fourth resonant circuit, the three resonance points including a first resonance point, a second resonance point, and a third resonance point, and
if a lowest resonance frequency that corresponds to the first resonance point is denoted by F1, a highest resonance frequency that corresponds to the third resonance point is denoted by F3, the second resonance point that corresponds to a resonance frequency between F1 and F3 is fixed, and
a drive frequency for driving the first switch or the second switch is denoted by Fs,
then, $1Fs \leq (F3-F1) < 2Fs$ is satisfied.

13. An insulated resonant power supply device, comprising:
the resonant inverter according to claim 9; and
a rectifier circuit placed on a secondary side of the transformer.

14. The resonant inverter according to claim 10, further comprising:
a fifth resonant circuit that includes a third capacitive element and a third coil and that is placed between the first switch and the second switch.

15. The resonant inverter according to claim 10, further comprising:
a third resonant circuit that includes a series connection of a fourth coil and a fourth capacitive element, the series connection being placed parallel to the first switch; and
a fourth resonant circuit that includes a series connection of a fifth coil and a fifth capacitive element, the series connection being placed parallel to the second switch.

16. The resonant inverter according to claim 11, wherein,
at least three resonance points are generated in response to resonance of the first resonant circuit, the second resonant circuit, and the fifth resonant circuit, the three resonance points including a first resonance point, a second resonance point, and a third resonance point, and
if a lowest resonance frequency that corresponds to the first resonance point is denoted by F1, a highest resonance frequency that corresponds to the third resonance point is denoted by F3, the second resonance point that corresponds to a resonance frequency between F1 and F3 is fixed, and
a drive frequency for driving the first switch or the second switch is denoted by Fs,
then, $1Fs \leq (F3-F1) < 2Fs$ is satisfied.

17. A resonant inverter comprising:
an input terminal to which an input voltage is applied;
a first switch and a second switch that are alternately turned on and off;
a transformer that includes a first winding and a second winding on a primary side;
a first resonant circuit that includes a first capacitive element and a first coil;
a second resonant circuit that includes a second capacitive element and a second coil;
a third resonant circuit that includes a series connection of a fourth coil and a fourth capacitive element, the series connection being placed parallel to the first switch; and
a fourth resonant circuit that includes a series connection of a fifth coil and a fifth capacitive element, the series connection being placed parallel to the second switch, wherein
the first switch, the first winding, and the first resonant circuit constitute a first inverter circuit,
the second switch, the second winding, and the second resonant circuit constitute a second inverter circuit, and
the input terminal is connected between the first winding and the second winding of the transformer.

* * * * *